United States Patent [19]

Svendsen

[11] Patent Number: 4,823,372
[45] Date of Patent: Apr. 18, 1989

[54] FILM EXPOSURE AND PROCESSOR SYSTEM
[75] Inventor: John A. Svendsen, May Township, Washington County, Minn.
[73] Assignee: Minnesota Mining and Manufacturing Company, St. Paul, Minn.
[21] Appl. No.: 13,739
[22] Filed: Feb. 12, 1987
[51] Int. Cl.⁴ ............................................. G03B 42/04
[52] U.S. Cl. .................................... 378/185; 378/173; 378/182
[58] Field of Search ......... 378/185, 182, 167, 172–174
[56] References Cited
U.S. PATENT DOCUMENTS
3,836,783  9/1974  Stievenart et al. ................. 378/185
4,234,796  11/1980  Caugant ............................. 378/173
4,482,233  11/1984  Bauer et al. ........................ 378/182

FOREIGN PATENT DOCUMENTS
1931645  12/1970  Fed. Rep. of Germany ...... 378/173

Primary Examiner—Craig E. Church
Assistant Examiner—John C. Freeman
Attorney, Agent, or Firm—Donald M. Sell; Walter N. Kirn; David W. Anderson

[57] ABSTRACT

A film handling system which permits industrial X-rays to be made on site comprises a film cassette having an area for a supply of film and an exposure area and the cassette after exposure of a film is placed in the throat of a processor. Upon placing the cassette in the throat of the processor a rack and pinion dispenses an exposed film from the cassette and upon removal of the cassette a film is moved from the storage area to the exposure area. The exposed film is processed in the processor.

5 Claims, 4 Drawing Sheets

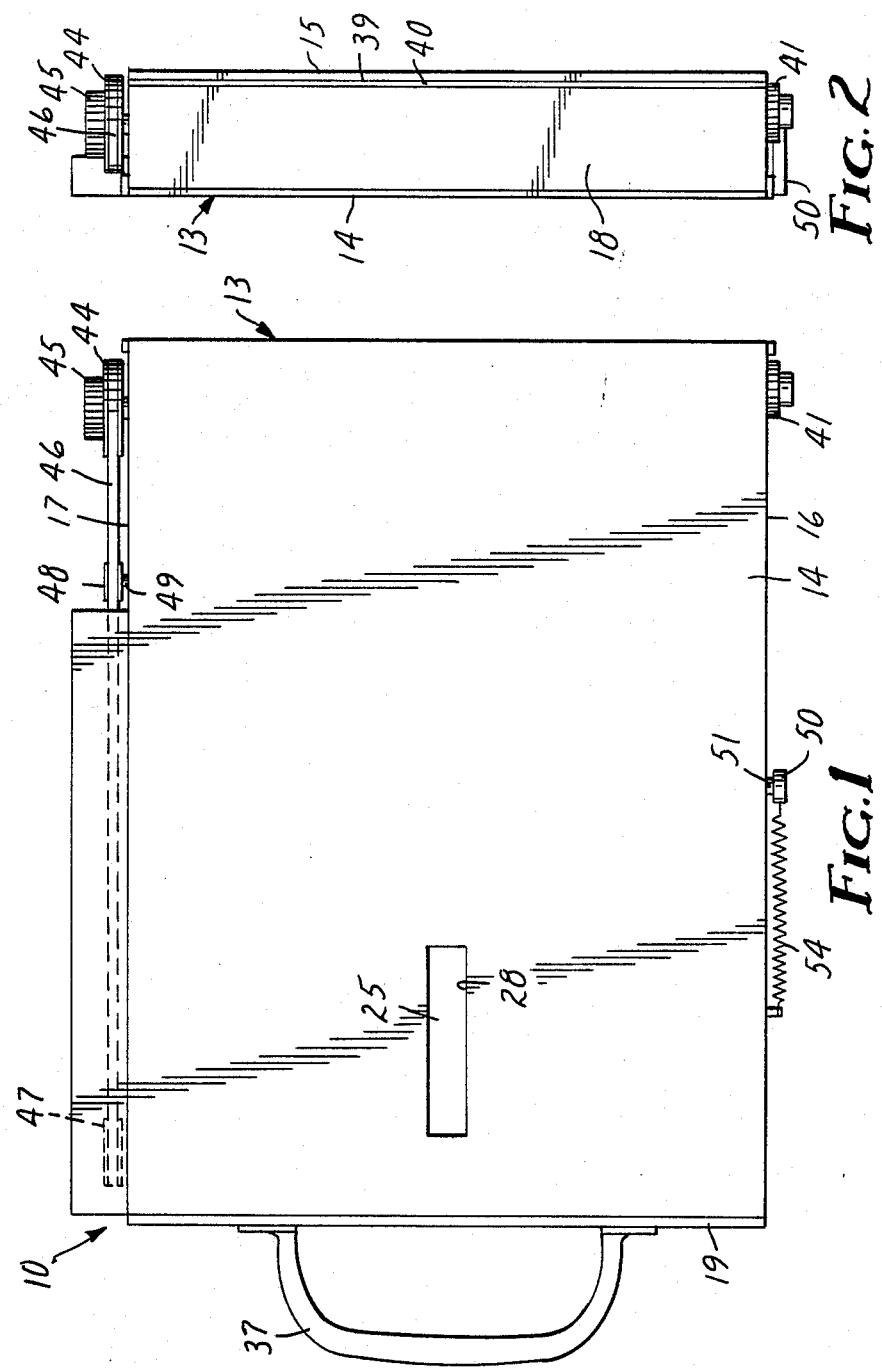

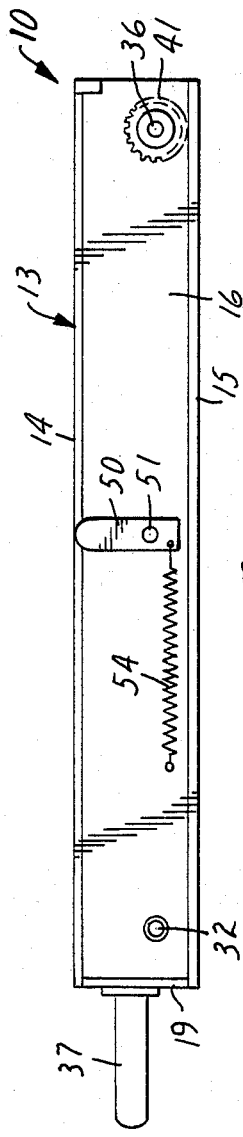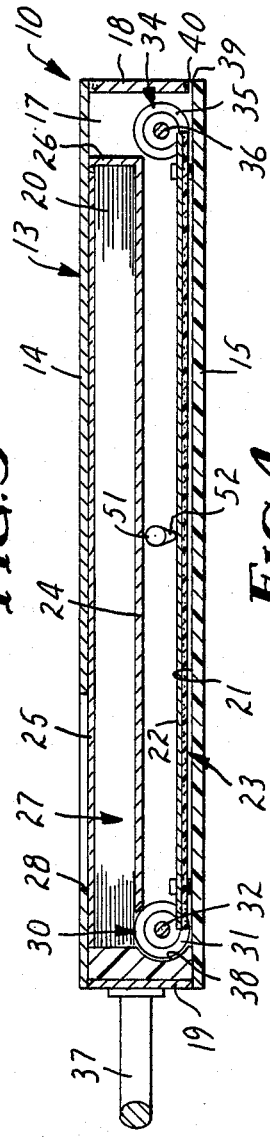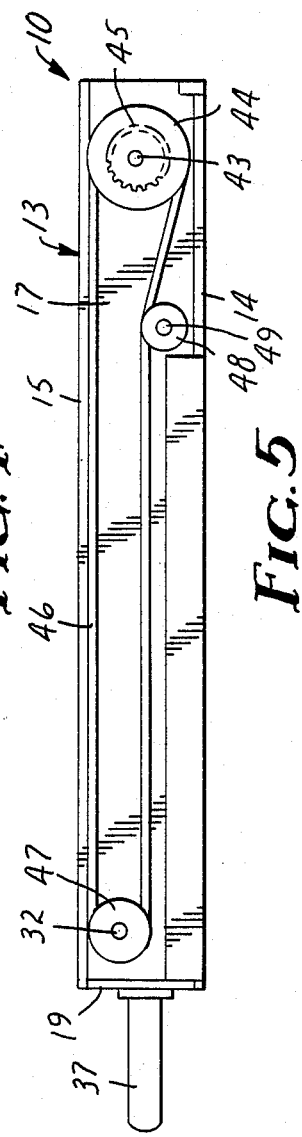

FILM EXPOSURE AND PROCESSOR SYSTEM

BACKGROUND OF THE INVENTION

1. Field of the Invention

This invention relates to an improved film handling system, and in one aspect to an improved film cassette and film processor affording improved convenience for taking industrial X-rays.

2. Description of the Prior Art

Prior known cassettes for industrial X-ray have utilized a cassette which must be loaded in a dark room with a single sheet of radiation sensitive sheet material, i.e. film, and it is then carried to the X-ray site for exposure. The cassette is then carried back to the dark room where the film is removed to be placed into a processor and an unexposed film is loaded in the cassette. A number of such cassettes could be carried to the field where the X-ray work is handled and then all of the cassettes carried back for processing. This requires the purchase of a number of cassettes, each cassette requiring an intensifying screen, in some cases.

The present cassette and processing system requires only a single cassette which may be loaded with a plurality of sheets of film and the portable processor with a cassette accepting loading throat. A film may be exposed in the cassette and after each exposure the cassette is placed in the processor and the sheet is fed from the cassette through the processor and a new unexposed sheet is placed in proper position in the cassette for the next exposure. This is done in ambient light.

To reduce the expense of the cassette, the cassette and the processor cooperate in providing drive mechanisms for extracting a sheet of exposed film from the cassette and placing the same in the processor and at the same time the loading of a new sheet of film into the cassette. The discharge of one film and the loading of a second is handled while the cassette is placed into the processor and removed from the processor, respectively.

SUMMARY OF THE PRESENT INVENTION

The present invention relates to a film cassette and a film processor for processing the exposed sheets.

The cassette comprises a housing having a film storage area and a film exposure area. The exposure area is defined between a radiation transmissive plate and a movable pressure pad. The storage area will accept a plurality of sheets and is an area spaced from the exposure area and shielded from radiation. Drive rollers afford dispensing of exposed sheets and movement of one sheet from the storage area to the exposure area.

The processor, compatible with the film, comprises a chute which defines a throat into which the cassette is placed to afford transfer of an exposed film from the cassette to the processor. Cooperating drive elements are provided on the chute and on the cassette for discharging an exposed film from the cassette to the processor upon insertion of the cassette into the processor. Also, the chute and processor contain cooperating drive means to advance a sheet from the storage area to the exposure area of the cassette upon removing the cassette from the processor.

DESCRIPTION OF THE DRAWING

The present invention will be described in greater detail with reference to the accompanying drawing illustrating a preferred embodiment of the invention wherein:

FIG. 1 is a top plan view of the cassette;
FIG. 2 is an end view of the cassette;
FIG. 3 is a right side view of the cassette;
FIG. 4 is a longitudinal vertical sectional view of the cassette;
FIG. 5 is a left side view of the cassette.

DETAILED DESCRIPTION

Figure 7:
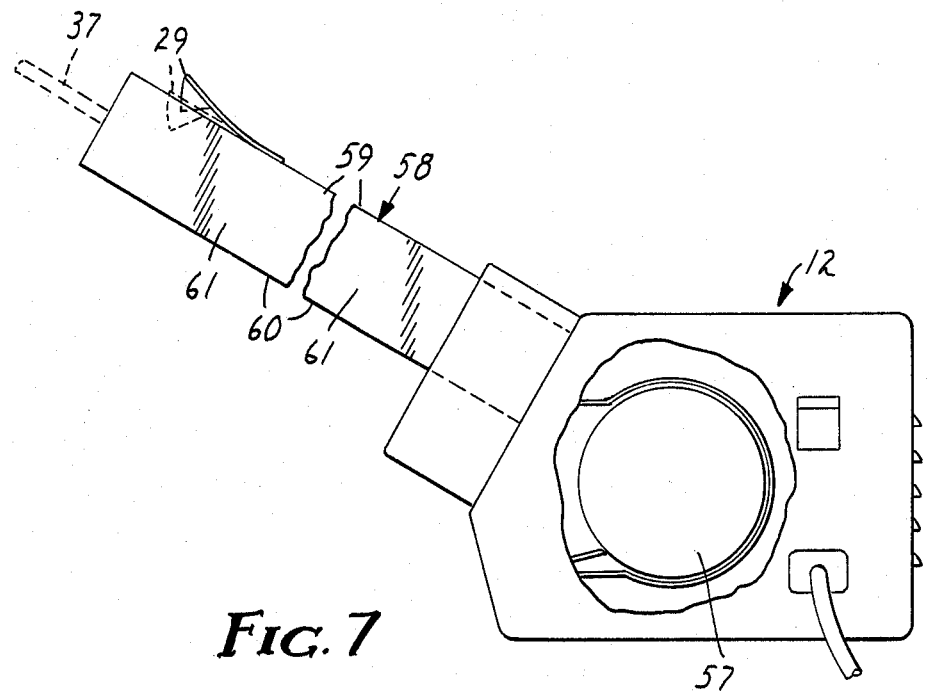
FIG. 7 is a side view, partly in section, of the processor and cassette.
Figure 8:
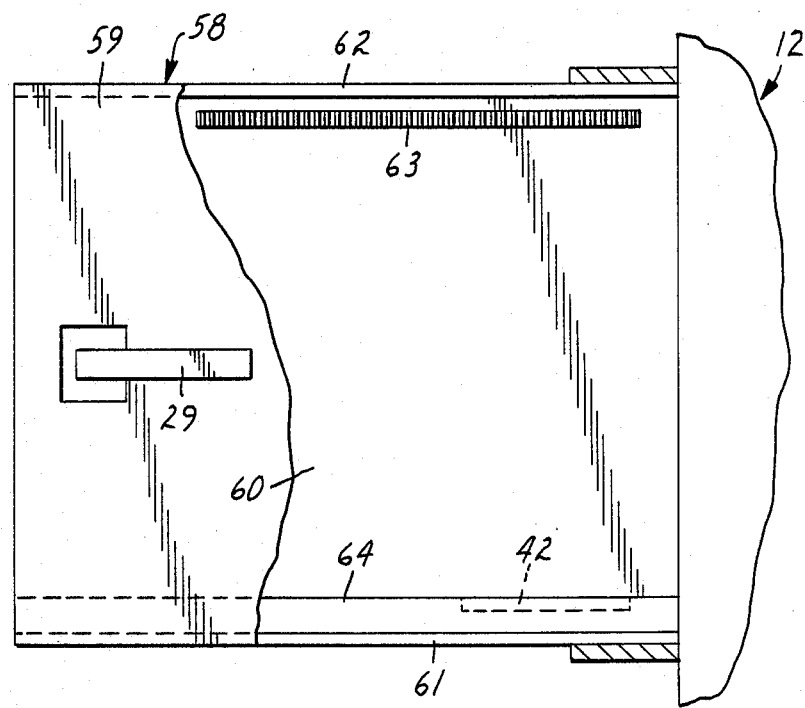
FIG. 8 is an enlarged top plan view of the processor showing part of the chute thereof in section to show interior parts.
Figure 9:
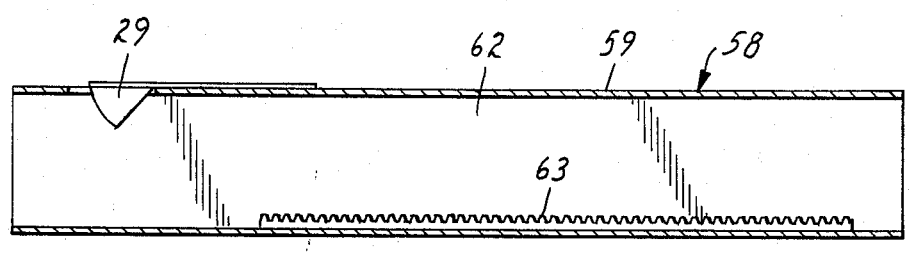
FIG. 9 is a longitudinal sectional view of the chute showing the left side wall.
Figure 10:
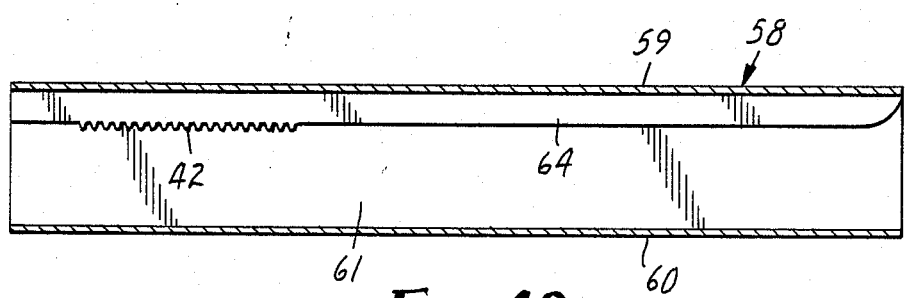
FIG. 10 is a longitudinal sectional view of the chute showing the right side wall.

As illustrated in the drawing, the present invention relates to an improved film handling system and particularly for handling film for industrial X-rays. The system comprises a film cassette 10 and a processor 12. The processor has a throat for receiving the cassette. The insertion of the cassette into the processor affords the discharge of an exposed sheet of film from the cassette into the processor without exposure in the ambient light. A new sheet is placed into exposing position or exposing area within the cassette upon removal of the cassette from the processor.

The cassette permits the exposure and processing of a number of sheets of film successively before the cassette is reloaded with fresh film. The film can be any radiation sensitive material. The cassette described is specially adapted for X-ray film which is heat processed. The cassette 10 comprises a housing 13 of generally rectangular shape comprising a top 14 and bottom wall 15 spaced by connecting side walls 16 and 17 and end walls 18 and 19. The bottom wall 15 is radiation transmissive, an opaque plastic, to permit exposure of a sheet of film 20 placed in an exposure position within the cassette. The cassette has an X-ray intensifying screen 21 and a movable pressure pad 22 between which is the location for the film in the exposure station generally designated 23. The top wall 14 is positioned in spaced relationship to a fixed plate 24 having a flange 26 at one end, preferably of aluminum and covered with a layer of lead as a shield to X-ray radiation. A plate 25 is positioned between the top wall 14 and the plate 24 and is pivoted adjacent the flange 26 and defines with plate 24 a storage area 27 for a plurality of unexposed sheets of film 20. The top wall 14 is provided adjacent end wall 18 with a hinge means to permit the top wall 14 and plate 25 to swing away from the plate 24 to insert fresh film into the storage area 27. Adjacent the end wall 19 of the cassette and in the top wall 14 is an access opening 28 through which biasing means in the form of a finger 29 mounted on a leaf spring may enter to urge the plate 25 and the sheets 20 in the storage area 27 against a first feed roll 30. This feed roll 30 comprises a pair of foam covered drive rollers 31 which are journalled on a shaft 32 by one-way drive bearings. The drive rollers 31 drive a sheet 20 in the storage area 27 into the exposure area 23 between the X-ray intensifying screen 21 and the pressure pad 22.

A second feed roll 34 is provided at the end of the cassette 10 opposite the first feed roll 30. The second feed roll 34 also has a pair of spaced foam covered rollers 35 mounted on a driven shaft 36 and journalled by one-way bearings for rotation of the rollers 35 in the same direction as rollers 31. The feed roll 34 serves to drive an exposed sheet of film out of the cassette.

The end wall 19 has a handle 37 affixed on one side and the opposite side is formed with a concave arcuate surface 38 to guide a sheet 20 driven by the drive rollers 31 from the storage area 27 to the exposure station 23.

The second feed roll 34 is driven to dispense an exposed sheet 20 from the exposure station through a slotted opening 39 in an end wall 18 opposite the wall 19. Means are provided for sealing the opening 39 against light reaching the exposure area. This means comprises a strip of fabric 40 having a pile to normally close the opening and resilient enough to allow a sheet to be driven through the opening 39 by the covered rollers 35 of roll 34. The shaft 36 of feed roll 34 is journalled in the side walls 16 and 17. Shaft 36 has an extended end which projects beyond the side wall 16 of the cassette. A toothed wheel or pinion gear 41 is fixed to the extended end of the shaft 36 of the feed roll 34. This gear 41 is provided for engagement with a rack 42 in the throat of the processor 12, which rack 42 will rotate the gear 41 and covered rollers 35 in a direction to-drive the exposed sheet of film through the opening 39 of the cassette 10.

A stub shaft 43 extending beyond the side wall 17, has a rotatable member comprising a belt pulley 44 and a second pinion gear 45 journalled thereon. A belt 46 extends around the pulley 44 and along the side wall 17 of the cassette 10 to a pulley 47 fixed on an extended end of the shaft 32 of first feed roll 30. The endless belt 46 is also trained over an idle roll 48 rotatable on a stub shaft 49.

Figure 6:
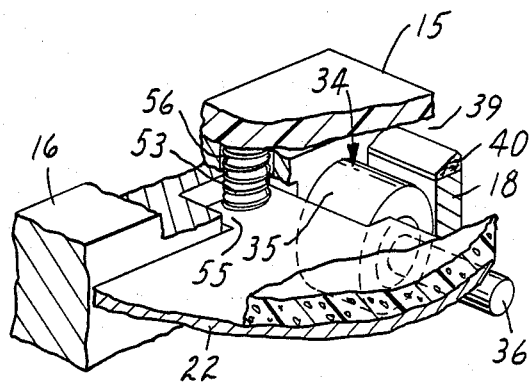
FIG. 6 is a detail sectional view of one interior corner of the cassette.

On the side wall 16 is positioned a radial arm 50 which is fixed to a transverse shaft 51 and serves to rotate cam means 52 in the form of pins positioned along the shaft internally of the cassette 10 and disposed on top of the pressure pad 22. The cam means 52 affords movement of the pressure pad 22 at the exposure station 23, against the bias of four springs 53, see FIG. 6, positioned one adjacent each corner of the pressure pad 22, to move a sheet of film into intimate contact with the X-ray intensifying screen 21. This arm 50 is normally pivoted to a position generally perpendicular to the length dimension of the side wall 16 by means of a tension spring 54. The cam member 52 forces the pressure plate 22 toward the film. The pressure plate 22 is formed of rigid sheet stock and has a layer of resilient material adjacent the film. The pressure plate 22 is supported between the drive rollers 31 and covered rollers 35 and is movable between a position adjacent the X-ray intensifying screen 21 and a spaced position defining a path for insertion and removal of a sheet 20 of film. The side walls 16 and 17 are formed with recessed areas accepting tabs 55 projecting from adjacent corners of the pressure plate 22. Springs 53 which are positioned in holes 56 formed below the recesses and aligned therewith engage the tabs 55 and urge the pressure plate 22 away from the bottom wall 15.

The cassette 10 as described, works in conjunction with the film processor 12, which as illustrated, has a throat to receive the cassette. The processor 12 is a thermoprocessor and comprises a heated shoe 57 which will receive the dispensed sheet 20 and transport the sheet about its surface to transfer heat to the light-sensitive coating on the sheet of film 20 and process the same as the sheet is heated to a predetermined temperature for a predetermined length of time. The throat in which the cassette is received comprises a chute 58 supported on the processor 12 in a position adjacent the opening for feeding sheets into the processor. This chute 58 has a generally rectangular opening at one end and is a hollow member shaped to accept the end of the cassette opposite the handle 37 fixed on the wall 19. The chute 58 has a top wall 59, bottom wall 60, and opposed side walls 61 and 62. On each of the side walls 61 and 62 is positioned a rack 42, 63, respectively, which racks are positioned parallel to the side walls and spaced from the bottom wall 60 to engage the pinion gears 41 and 45, respectively, on the cassette. A cam surface 64 is positioned on the side wall 62 along the top wall 59 of the chute to engage and bias the radial arm 50 against the tension of spring 54 to open the pressure pad 22 and move the same away from the radiation intensifying screen 21. Associated with this cam surface 64 and spaced from the top wall 59 is the rack 42 that turns the rollers 35 to drive the exposed sheet 20 from the cassette 10 into the processor 12.

In operation, as the film cassette is placed at the mouth of the chute, the operator can then slide the cassette 10 down the chute 58 toward the processor 12. Prior to the gear 41 engaging the gear rack 42 the cam surface 64 engages the arm 50 to rotate the shaft 51 and the cam means 52 to move the pressure plate 22 away from the sheet of film 20 and the radiation intensifying screen 21. Further movement toward the processor thus engages the gear 41 with the gear rack 42 causing the shaft 32 to be driven in a direction for the one-way bearings to drive rollers 35 to drive the exposed sheet of film 20 through the opening 39 in the end of the cassette and into the processor 12. The cassette 10 continues to be moved into the chute 58 until it strikes the bottom and the gear 41 has driven the lead end of the sheet into the processor. The pinion gear 45 is engaged with the rack 63 but driving the belt 46 does not drive the rollers 31 as the one-way bearings do not transfer the clockwise rotation of the pinion gear 45 to drive the rollers 31. As the exposed piece of film enters the processor 12 it is drawn by the processor out of the cassette. After the film leaves the cassette and enters the processor the operator can then grasp the handle 37 of the cassette withdrawing the same from the chute 58.

As the operator withdraws the cassette 10 from the chute 50, the gear 45 engaged with the gear rack 62, drives the pulley 47 and belt 46 to drive feed roll 30. The pressure finger 29 positioned in the top wall 59 of the chute 58 extends through the access opening 28 in the top wall 14 of the cassette forcing the plate 25 and sheets 20 in the storage area 27 against the drive rollers 31. As the cassette is withdrawn the feed roll 30 and rollers 31, driven by the shaft 32 and one-way bearings, cause the adjacent or bottom sheet in the storage area to be driven toward the end wall 19 and about the arcuate guide 38. An unexposed sheet 20 is thus placed in the exposure area between the radiation intensifying screen 21 and the pressure pad 22. This movement of the sheet from the storage area to the exposure area takes place upon withdrawing the cassette from the chute along the gear rack 63. The rollers 35 are not being driven upon withdrawal of the cassette. As the cassette reaches the position in the chute where the cam 64 releases the arm 50 the spring 54 thus urges the shaft 51 in a reverse direction and the cam members 52 drive the pressure pad 22 against the sheet of film 20 moving the same against the intensifying screen 21 and the cassette is now loaded with an unexposed sheet of film ready for another exposure.

It is understood that the film and processor may be adapted for chemical treatment as opposed to a dry heat developed film, but, the need for a chemical processor makes the same less convenient for portability.

Having thus described the present invention in relation to a preferred embodiment of the same it is to be understood that changes may be made without departing from the spirit or the scope of the invention as described in the appended claims.

I claim:

1. A cassette for use with sheets of film to permit exposure of one sheet in an exposure position and then the dispensing of the exposed sheet and the feeding of another sheet from a supply of sheets to said exposure position, said cassette comprising a housing, said housing comprising a generally rectangular top and bottom wall spaced by connecting side and end walls, said bottom wall affording X-ray exposure of a said sheet therethrough, storage means for containment of a number of sheets in said housing between said said top and bottom wall, one said end wall having an opening through which an exposed sheet may be dispensed, means forming a light seal at said opening, movable pressure pad means for pressing a sheet against said bottom wall, a first drive roller means disposed within said housing for advancing a sheet between said pressure pad means and said bottom wall, a second drive roller means for driving an exposed sheet from between said pressure pad means and said bottom wall out said opening, and drive means, including first and second pinion gears external to said side walls of the cassette, for operation of said first and second drive roller means respectively in response to external forces being placed against said drive means; and one-way bearings for each of said first drive roller means and said second drive roller means affording rotation with said first and second pinion gears each in only one respective direction.

2. A cassette corresponding to claim 1 further including an intensifying screen positioned on said bottom wall.

3. A cassette corresponding to claim 2 further including a shield to protect sheets in said storage means from radiation passing through said bottom wall.

4. A cassette corresponding to claim 1 wherein said pinion gears are disposed outside said housing and adjacent said side walls for driving said rollers upon engagement with stationary racks.

5. A film handling system affording the exposure and development of successive sheets of X-ray sensitive media comprising a cassette having a light-tight rectangular housing in which are means defining a sheet storage area and an individual sheet exposing are, drive roller means for moving a sheet form said sheet storage area to said exposing area and for dispensing an exposed sheet from said housing, pinion gears external to said housing for driving said drive roller means in one direction to afford movement of a sheet to said exposing area form said storage area and to dispense the exposed sheet from the housing, and a processor for receiving and developing a said sheet, said processor having a chute to receive said cassette, said chute being aligned with a sheet receiving opening of said processor to receive a sheet dispensed from said cassette, said chute including a pair of racks in engagement with said pinion gears for driving said drive roller means upon insertion of said cassette into said chute and removal of said cassette from said chute.

* * * * *